United States Patent
Inturi et al.

(10) Patent No.: US 10,026,423 B1
(45) Date of Patent: Jul. 17, 2018

(54) MODERATE MILL RESIST AND WET-ETCHABLE ALLOY FOR USE IN A RECORDING HEAD FABRICATION PROCESS

(71) Applicant: Seagate Technology LLC, Cupertino, CA (US)

(72) Inventors: Venkateswara Inturi, Shakopee, MN (US); Steven C. Riemer, Minneapolis, MN (US); Dong Lin, Eden Praire, MN (US); Joseph Mundenar, Eden Prairie, MN (US); Alexander Bramer, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/583,368

(22) Filed: May 1, 2017

(51) Int. Cl.
*G11B 5/127* (2006.01)
*G11B 5/31* (2006.01)

(52) U.S. Cl.
CPC ............ *G11B 5/3169* (2013.01); *G11B 5/313* (2013.01)

(58) Field of Classification Search
None
See application file for complete search history.

(56) References Cited

U.S. PATENT DOCUMENTS

| | | | |
|---|---|---|---|
| 7,117,583 B2 | 10/2006 | Dinan et al. | |
| 7,139,153 B2* | 11/2006 | Hsiao | G11B 5/1278 360/125.03 |
| 7,203,032 B2* | 4/2007 | Kimura | G11B 5/1278 360/125.38 |
| 7,281,316 B2* | 10/2007 | Hsiao | G11B 5/1278 216/22 |
| 7,726,009 B1* | 6/2010 | Liu | G11B 5/1278 216/22 |
| 8,320,076 B1* | 11/2012 | Shen | G11B 5/3116 360/125.04 |
| 8,830,624 B2 | 9/2014 | Luo et al. | |
| 8,830,626 B2 | 9/2014 | Heim et al. | |
| 8,842,390 B2 | 9/2014 | Shen et al. | |
| 9,196,267 B2 | 11/2015 | Basu et al. | |
| 9,275,662 B2 | 3/2016 | Isowaki et al. | |
| 9,343,085 B2 | 5/2016 | Basu et al. | |
| 2007/0002493 A1 | 1/2007 | Dinan et al. | |
| 2009/0268344 A1* | 10/2009 | Guan | G11B 5/1278 360/119.02 |
| 2012/0237878 A1* | 9/2012 | Zeng | G11B 5/3116 430/319 |

* cited by examiner

*Primary Examiner* — William J Klimowicz
(74) *Attorney, Agent, or Firm* — Westman, Champlin & Koehler, P.A.

(57) ABSTRACT

A method of forming a magnetic recording head. The method includes depositing a sacrificial metal alloy layer, which is wet etchable and has a moderate mill resistance, over a substrate. The method also includes depositing a write pole layer over the sacrificial metal alloy layer. The write pole layer has a bottom surface and a top surface opposite the bottom surface. A portion of the bottom surface of the write pole layer is in contact with the sacrificial metal alloy layer.

15 Claims, 10 Drawing Sheets

MODERATE MILL RESIST AND WET-ETCHABLE ALLOY FOR USE IN A RECORDING HEAD FABRICATION PROCESS

BACKGROUND

Data storage devices use magnetic recording heads to read and/or write data on magnetic storage media, such as data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media.

With ever-increasing levels of recording density in disc drives, the write element needs to have correspondingly better data-recording capabilities. A fabrication process utilized to form the write element impacts its data-recording capability.

SUMMARY

Various embodiments of the disclosure generally relate to a moderate mill resist and wet-etchable alloy for use in a recording head fabrication process.

In one embodiment, a method is provided in which a sacrificial metal alloy layer, which is wet etchable and has a moderate mill resistance, is deposited over a substrate. A write pole layer is deposited over the sacrificial metal alloy layer. The write pole layer has a bottom surface and a top surface opposite the bottom surface. A portion of the bottom surface of the write pole layer is in contact with the sacrificial metal alloy layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to a metal alloy that has a moderate mill resistance and is also wet etchable, which makes the alloy suitable for use in the fabrication of a write element. However, prior to providing additional details regarding the different embodiments, a description of an illustrative operating environment is provided below.

Figure 1A:
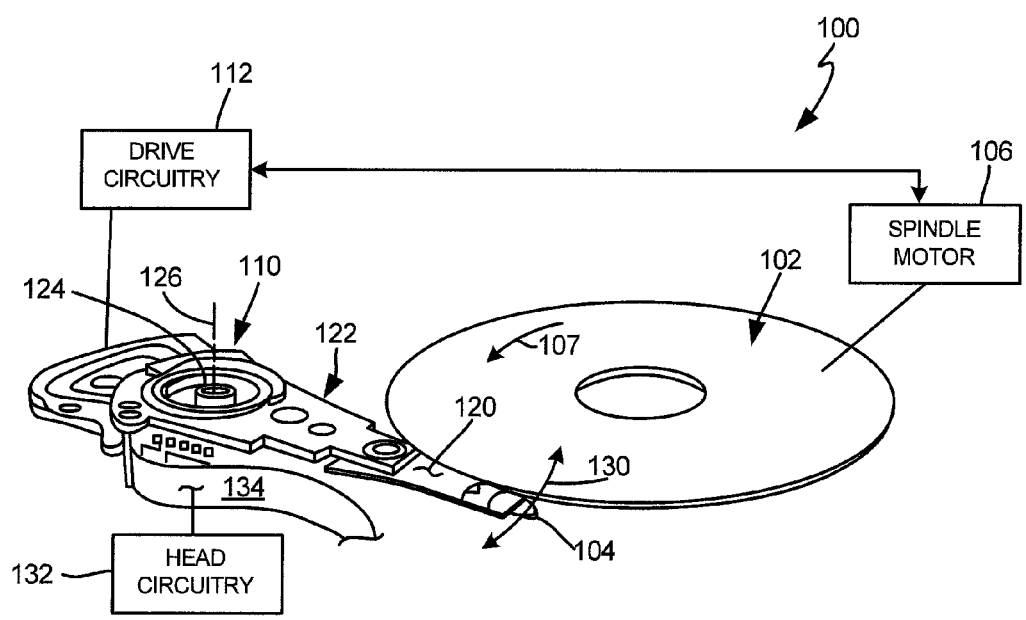
FIG. 1A illustrates an embodiment of a data storage device in which embodiments of the present application can be used.

FIG. 1A shows an illustrative operating environment in which certain write head embodiments formed as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a magnetic data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
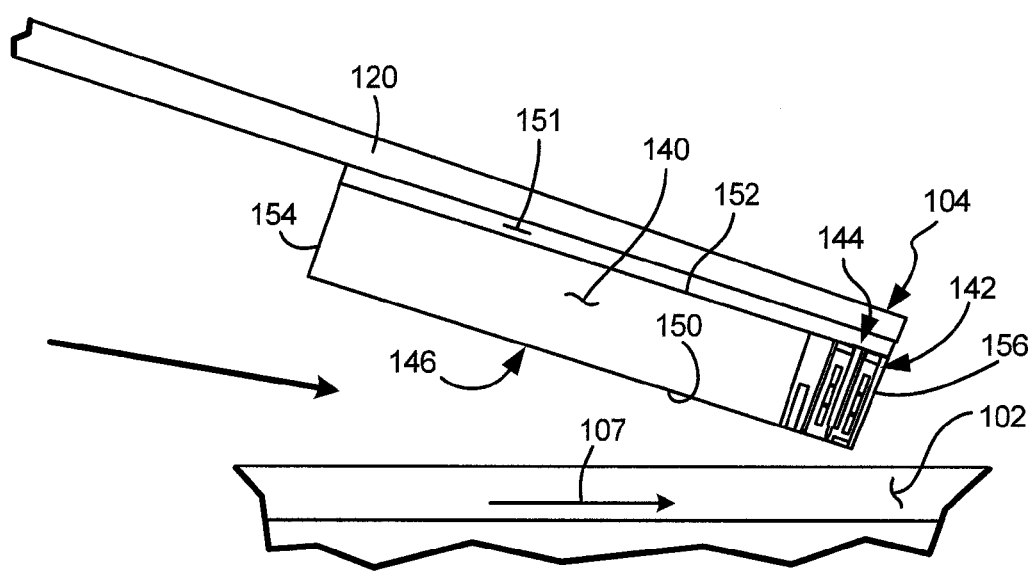
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 2A and 2B.

Figure 2A:
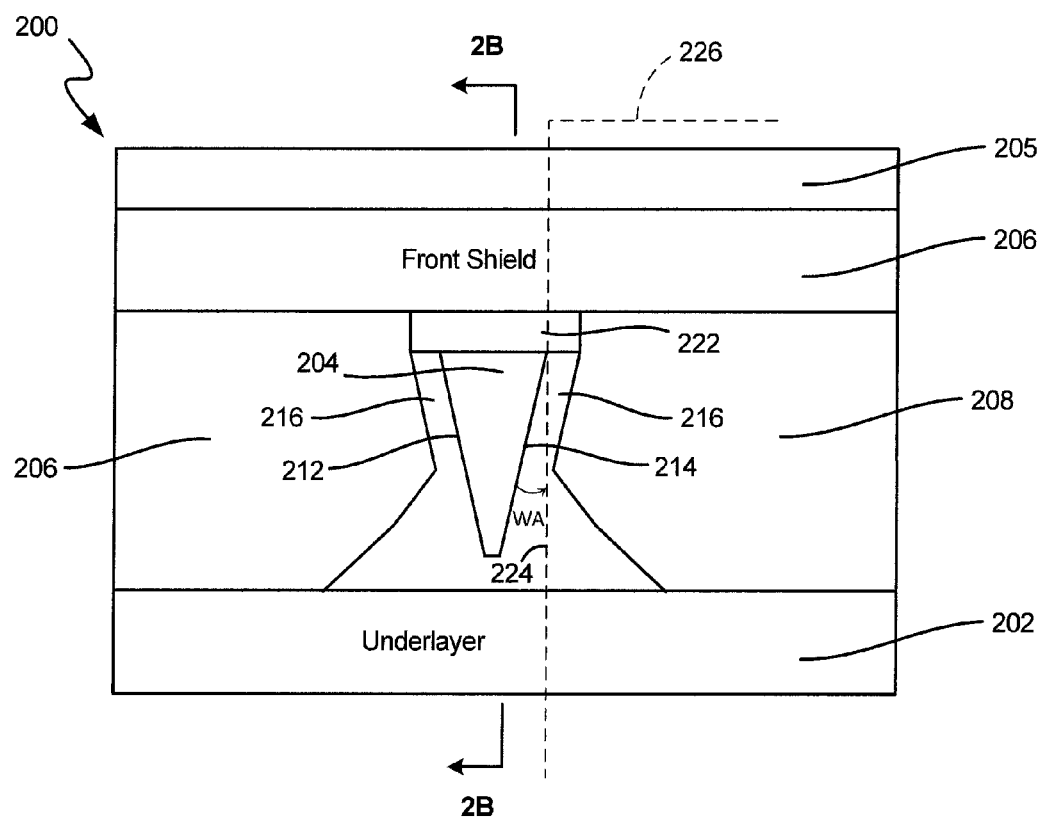
FIG. 2A depicts a bearing surface view of a perpendicular magnetic recording (PMR) transducer in accordance with one embodiment.
Figure 2B:
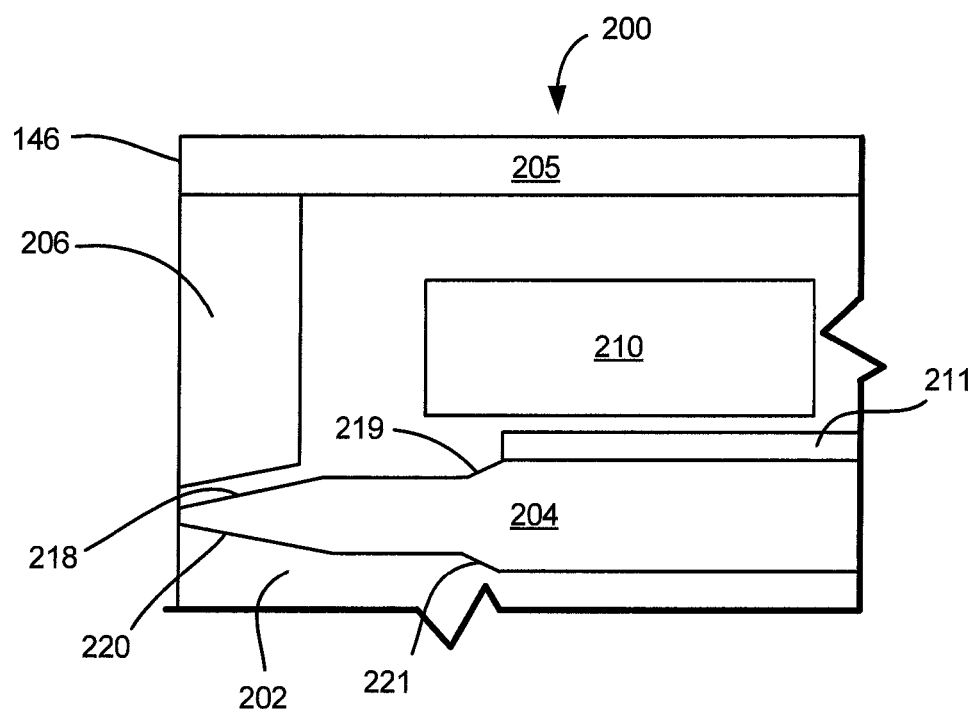
FIG. 2B depicts a side view of the PMR transducer of FIG. 2A.

FIGS. 2A and 2B depict air bearing surface and side views, respectively, of a perpendicular magnetic recording (PMR) transducer 200, which may be formed by method embodiments described further below. The PMR transducer 200 may be a part of a merged head including the write transducer 200 and a read transducer (not shown). Alternatively, the magnetic recording head may be a write head only including the write transducer 200. The PMR transducer elements shown in FIGS. 2A and 2B are illustratively included in a recording head such as recording head 104 of FIGS. 1A and 1B.

The write transducer 200 includes an under-layer/substrate 202, a main pole 204, at least one return pole 205, a front shield 206 and side shields 208. The under-layer 202 may include multiple structures which are under the pole 204. The write transducer 200 may also include other components including but not limited to coils (denoted by reference numeral 210 in FIG. 2B) for energizing the main pole 204, and a yoke 211.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 also has a beveled portion 218. The bottom (leading) surface of the main pole 204 may also include a leading surface bevel 220. Additional beveled portions 219 and 221 may also be present behind the bearing surface 146. A FSG 222 is formed between the main pole 204 and the front shield 206.

As can be seen in FIG. 2A, at the bearing surface 146, the main pole 204 has a trapezoid shape with a wall angle (WA), which is an angle between the sidewall 212, 214 and a down-track direction 224. In general, using relatively high WAs benefits tracks per inch (TPI) at skew, which may be due a low fringing field in a cross-track direction denoted by reference numeral 226 in FIG. 2A. The ability to optimally form sidewalls 212 and 214 with suitable WAs depends on a material utilized directly below the main pole 204 during fabrication of write transducer 200. That material, which forms a part of a "bumper" feature, needs to prevent erosion of the pole tip 204 during a milling process employed to provide the trapezoidal shape with suitable WAs.

Substantially pure copper (Cu) has been used for the bumper material in some prior writer fabrication processes. However, Cu suffers from low mill resistance and non-uniform mill rates due to Cu growth texture. In addition, Cu film grain size is substantially large and therefore may not be favorable for subsequent layer growth (e.g., writer material (e.g., iron-cobalt (FeCo)) growth on relatively large Cu grains may be suspect). Accordingly, embodiments of the disclosure provide a material that has moderate mill resistance compared to various metals and has wet-etchable characteristics. In one embodiment, copper-tungsten (CuW) is used as a bumper material. CuW has a nearly 40% higher mill resistance than Cu and it is wet-etchable. In addition, CuW does not grow in large grains and therefore does not affect the writer pole material growth. It should be noted that, as used herein, a moderate mill resistance is a mill resistance between low mill resistance typical of Cu, Au, Ag, etc., and high mill resistance typical of elements/materials such as Fe, FeCo, NiFe, Ta, W, alumina, etc. A method of manufacturing a magnetic write head/transducer such as 200 using CuW, for example, as a bumper material is described in connection with FIGS. 3A-3I.

Figure 3A:
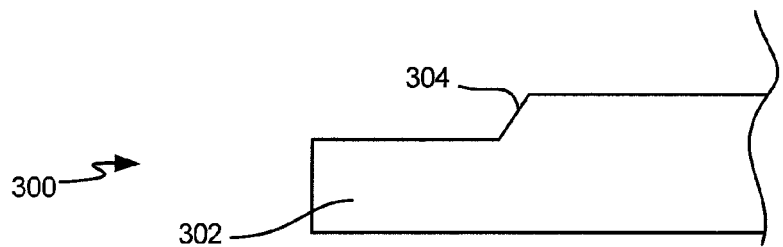
FIGS. 3A-3I illustrate process steps for fabricating a PMR transducer of the type shown in FIGS. 2A and 2B.

FIGS. 3A-3I illustrate block diagrams of partial write transducer structures during manufacturing of a write transducer such as 200. Referring now to FIG. 3A, which illustrates a side view of a partial write transducer structure 300, a substrate or under-layer 302 is provided. The substrate or under-layer 302 can be, for example, an insulation layer such as alumina ($Al_2O_3$) or can include multiple layers with at least one of the multiple layers being an insulation layer. Other structures or devices in a head may also be in or below the under-layer or substrate 302. As can be seen in FIG. 3A, under-layer 302 is configured to have a bumper bevel 304. As will be described further below, inclusion of bumper bevel 304 enables formation of a write pole having two different thicknesses in two different regions of the write pole. The bumper bevel 304 helps provide a transition between the two thickness levels. While the implementation of FIG. 3A is shown to have the bumper bevel 304 having a linear slope, in an alternate implementation, the bevel 304 is provided to have a curved slope, a step structure, etc.

Figure 3B:
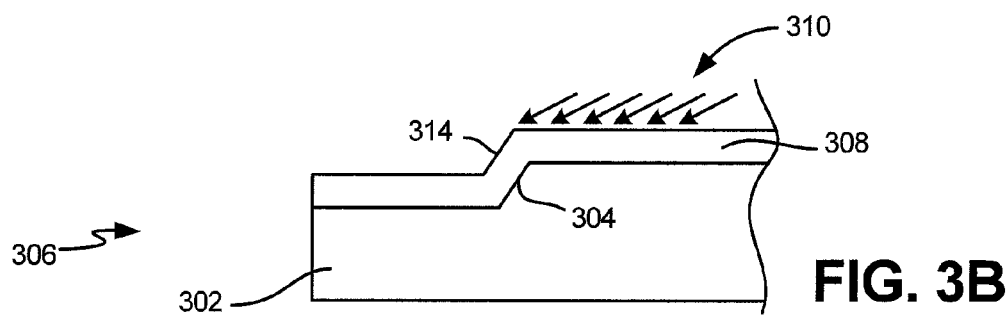

FIG. 3B is a side view of a partial write transducer structure 306. Structure 306 includes the substrate or under-layer 302 and a metal alloy layer 308, which has a moderate mill resistance and is also wet etchable, deposited on under-layer 302. In one embodiment, layer 308 is formed of CuW. The partial write transducer structure is illustrated as undergoing material removal process (e.g., a milling operation) 310. In the embodiment shown in FIG. 3B, the milling operation 310 is conducted at such an angle so that a part of the metal alloy layer 308 is protected from the milling operation. For example, the milling operation is conducted at an angle that is lower (as compared to the horizontal surface) compared to the angle of the bevel 304 (again, as compared to the horizontal surface). The milling operation mills away most of the metal alloy material of layer 308, except for the material that is protected due to the angle of the bumper bevel 304.

Figure 3C:
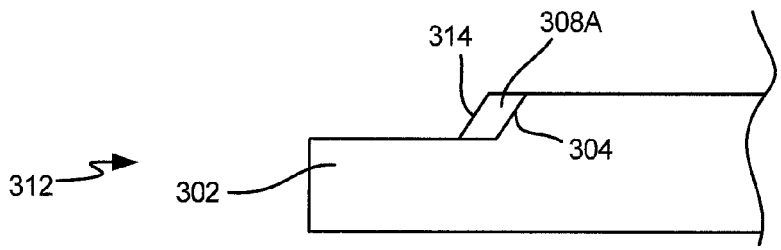

FIG. 3C illustrates a side view of another partial write transducer structure 312. Structure 312 is generated as a result of the milling operation (310 of FIG. 3B) on the partial write transducer structure 306 of FIG. 3B. As noted above, as the milling angle of the milling operation 310 is lower than the angle of the bumper bevel 304, a portion of the metal alloy layer 308 is preserved on the under-layer 302.

The preserved portion of the metal alloy layer is denoted by reference numeral 308A in FIG. 3C. Layer 308A is illustrated to have an internal beveled edge that coincides with the bumper bevel 304 and an external beveled edge 314. It should be noted that while the implementation of the write transducer structure illustrated in FIG. 3C has the internal beveled edge, which coincides with bumper bevel 304, and the external beveled edge 314 substantially parallel to each other, in an alternative embodiment, the external beveled edge 314 may have a lesser slope compared to the internal beveled edge. In still another embodiment, the external beveled edge 314 may have a greater slope compared to the internal beveled edge.

Figure 3D:
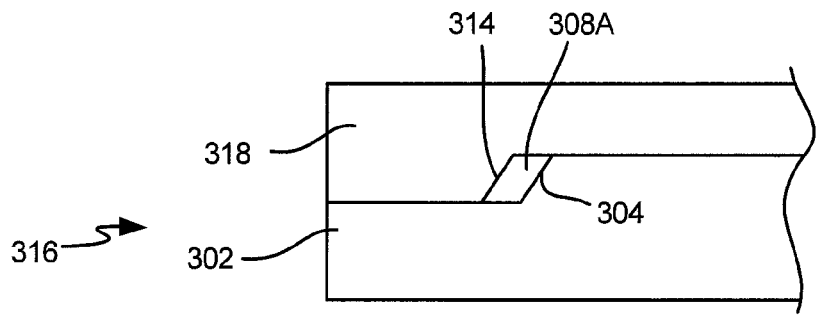

FIG. 3D illustrates a side view of yet another partial write transducer structure 316. Structure 316 shows a write pole layer 318 deposited on the combination of the under-layer 302 and the metal alloy layer 308A. The write pole layer 318 may include a single magnetic material or may be formed of several materials. In certain embodiments, write pole layer 318 is made of a ferromagnetic material such as, but not limited to, Fe, Co, Ni, and combinations thereof. In some embodiments, layer 318 may be a lamination of magnetic layers such as CoFe, NiFe, or their alloys separated by thin non-magnetic layers such as alumina, silicon dioxide or some other material. After the write pole layer 318 is deposited, one or material-removal processes are carried out to provide a trapezoidal shape for the write pole.

Figure 3E:
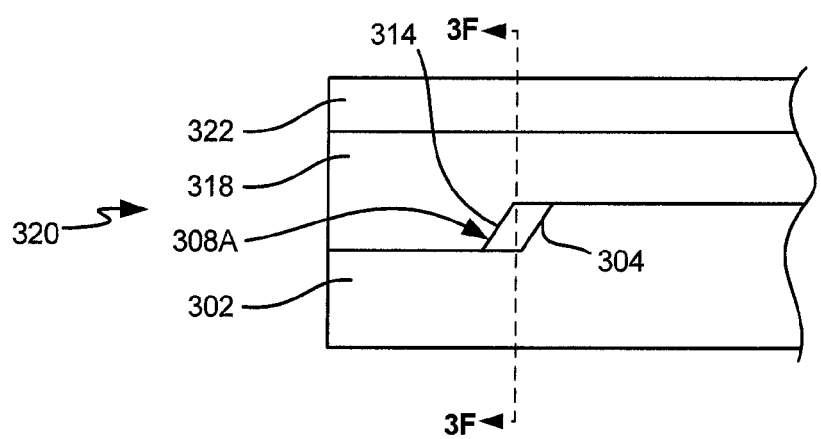
Figure 3F:
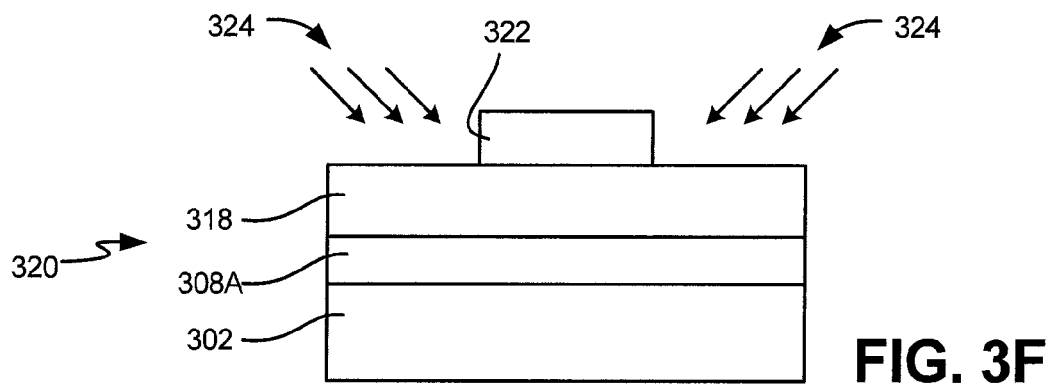
Figure 3G:
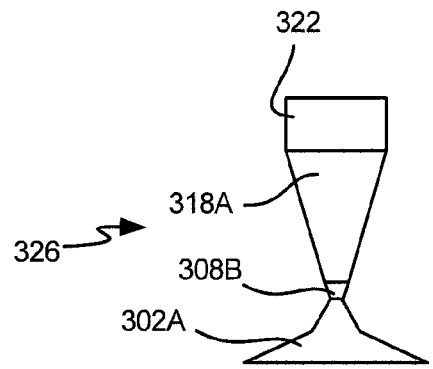

FIGS. 3E and 3F illustrate side and bearing surface views, respectively, of a partial write transducer structure 320. Specifically, structure 320 shows a mask structure 322 formed over the write pole layer 318 of structure 316 of FIG. 3D. The mask structure may include one or more layers such as one or more hard mask layers, one or more image transfer layers, and/or a mask material such as photoresist or thermal image resist. A material removal process is performed to remove portions of the write pole layer that are not protected by the mask structure 322. The material removal process, represented by slanted arrows 324, may be performed, for example, by a suitable milling operation (e.g., dry ion etching) carried out at an angle or combination of angles relative to normal. As a result of milling at an angle or at angles to the normal, some magnetic material 318 directly beneath the mask structure 322 may be removed to form write pole 318A with a shape as shown in FIG. 3G, which is a bearing surface view of a partial write transducer structure 326. As can further be seen in FIG. 3G, portions of metal alloy material of layer 308A and portions of the insulating material of under-layer 302 are also removed as a result of the milling operation. The remaining portion of the metal alloy layer 308A is denoted by reference numeral 308B in FIG. 3G. Also, the remaining portion of under-layer 302 is denoted by reference numeral 302A in FIG. 3G.

As noted above, in some embodiments, the metal alloy material (e.g. CuW) 308, 308A, 308B has a nearly 40% higher mill resistance than Cu. The higher mill resistance prevents erosion of the pole tip 318A during the milling process and thereby assists in obtaining optimal WAs. In some embodiments, the WAs produced are between about 13 degrees and about 18 degrees. In general, with the use of metal alloy layer (e.g., CuW) 308, 308A, 308B, WAs greater than 13 degrees may be obtained without substantial erosion of the pole tip 318A.

Figure 3H:
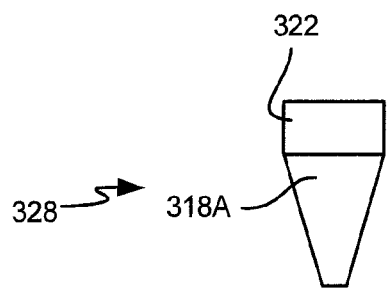
Figure 3I:
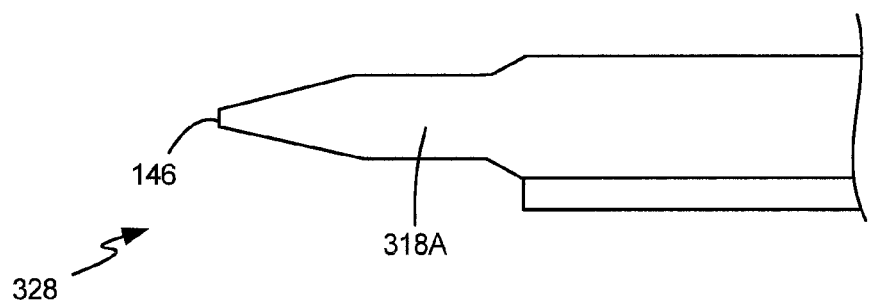

After the formation of partial write transducer structure 326, bumper portion 302A is removed by a suitable material removal process. Thereafter, sacrificial layer 308B is removed. In some embodiments, removing the sacrificial CuW layer 308B involves carrying out a wet etch process on partial write transducer structure 326 using a Cu etchant. In other words, a different etchant is not needed due to the presence of W along with Cu in layer 308B. Accordingly, in accordance with one embodiment, after removal of bumper portion 302A, the remainder of structure 326 that includes CuW sacrificial material layer 308B is immersed in a high pH or basic pH etch bath including a Cu etchant that will not readily etch the magnetic pole material 402. This will result in a partial write transducer structure 328, which is shown in FIG. 3H. It should be noted that FIG. 3H only shows portions of partial write transducer structure 328 that are at the bearing surface 146. Portions of structure 328 that are behind the bearing surface can be seen in FIG. 3I.

After formation of structure 328, additional layers of different materials are deposited to form SSGs such as 216 of FIG. 2A, side shields such as 208 of FIG. 2A, FSG such as 222 of FIGS. 2A and 2B, etc. In the interest of brevity, details regarding the formation of SSGs 216, side shields 208, FSG 222, etc., are not provided.

Figure 4:
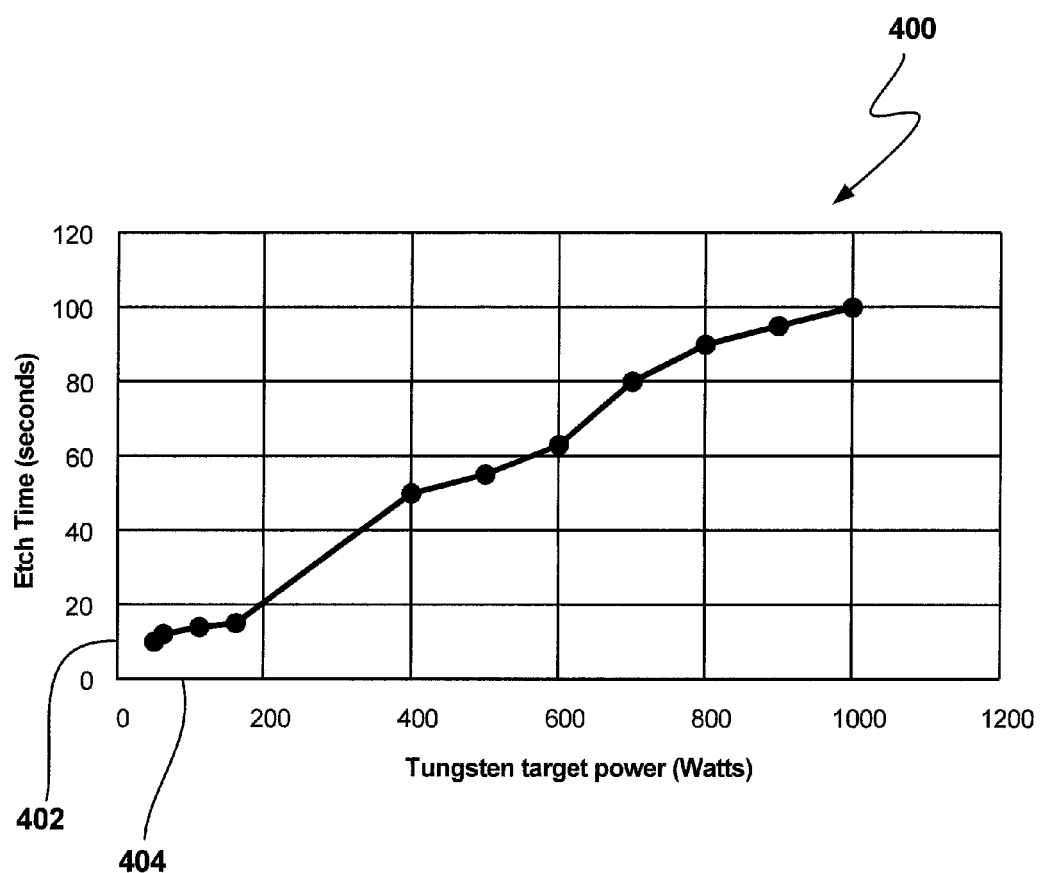
FIGS. 4 and 5 are graphs of experimental results.

FIG. 4 is a graph 400 illustrating wet etch times for a series of wafers including Cu and W of differing atomic percentages. To obtain the series of wafers, Cu and W were deposited from separate targets within a same chamber on a substrate. The Cu target was kept at a constant power during formation of each wafer and the W target power was varied for different wafers to obtain different atomic percentages for Cu and W. In FIG. 4, a vertical axis 402 represents etch times in seconds and a horizontal axis 404 represents W target power in Watts. It was found that wet etching with a Cu etchant was successful (e.g., no residue remained) for different CuW atomic percent combinations up to 40 atomic percent of W.

Figure 5:
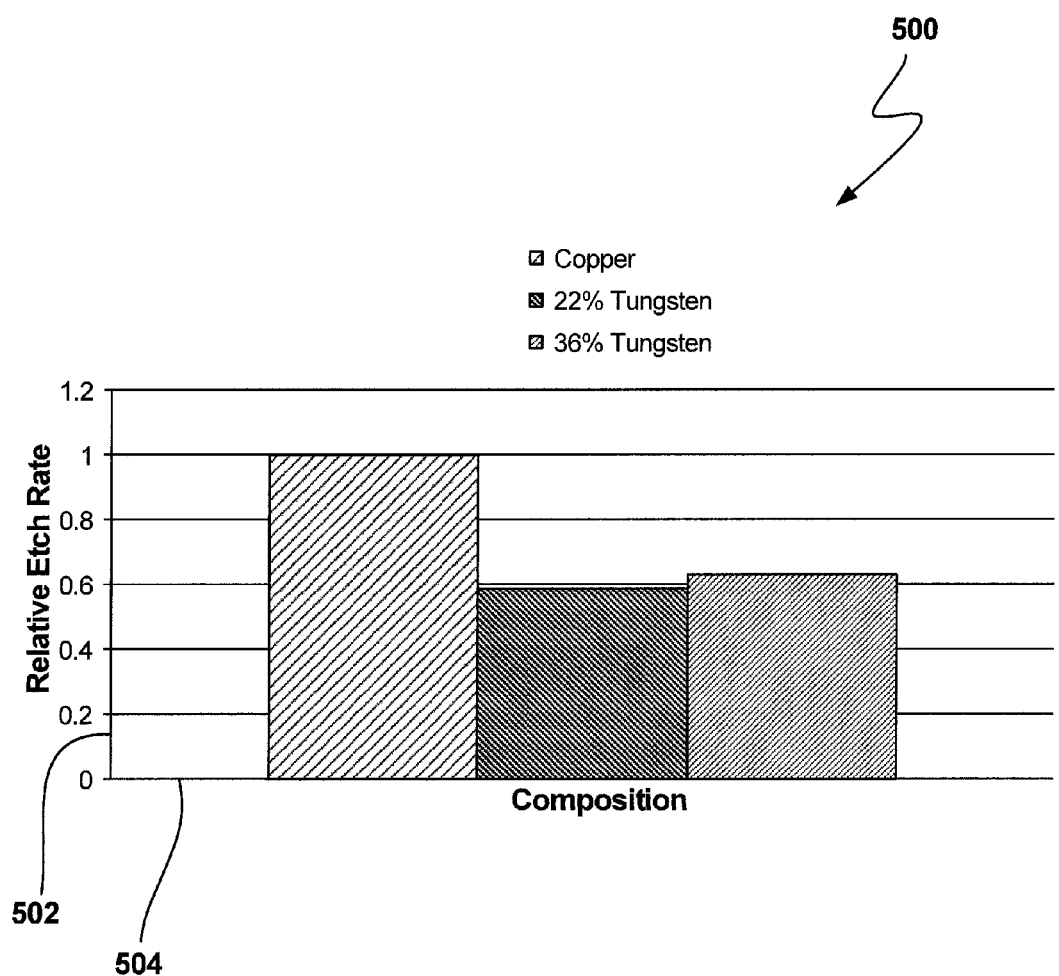

FIG. 5 is a graph 500 illustrating dry etch or mill rates for a Cu wafer and two CuW wafers of differing Cu and W atomic percentages. In FIG. 5, a vertical axis 502 represents etch times in seconds and a horizontal axis 504 W represents Cu and/or W composition. It was found that, with the addition of W with the atomic percentages shown in FIG. 5, about a 40 percent reduction in mill rate was obtained over the substantially pure Cu wafer.

Figure 6:
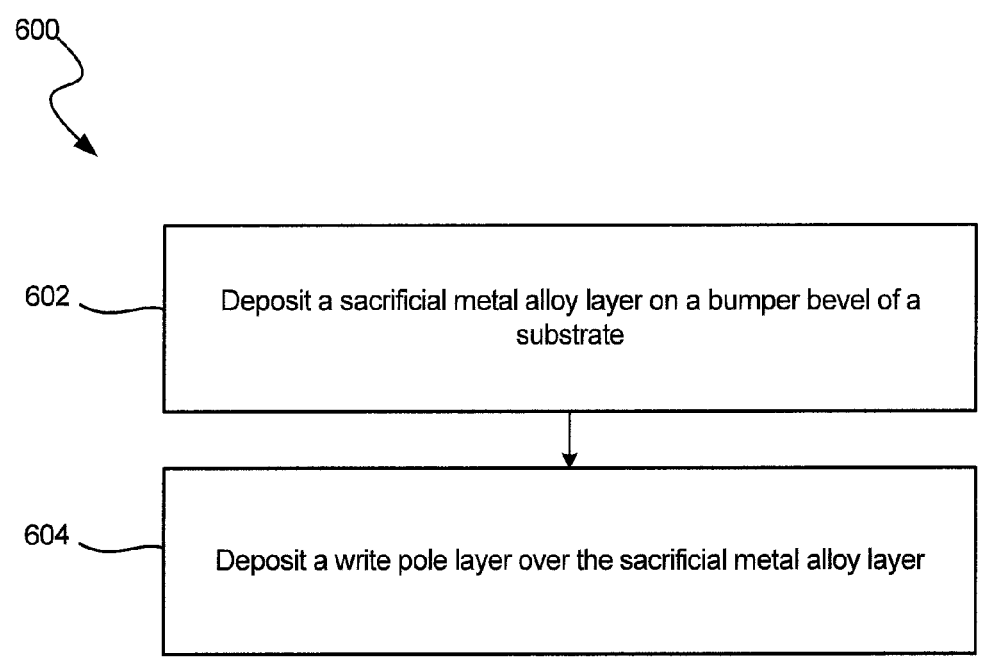
FIG. 6 is a flow diagram of a method embodiment.

FIG. 6 is a simplified flow diagram 600 of a method embodiment. At step 602, a sacrificial metal alloy layer is deposited over a bumper bevel of a substrate. The sacrificial metal alloy layer is wet etchable and has a moderate mill resistance. At step 604, a write pole layer is deposited over the sacrificial metal alloy layer. The write pole layer has a bottom surface and a top surface opposite the bottom surface. A portion of the bottom surface of the write pole layer is in contact with the sacrificial metal alloy layer. In one embodiment, the sacrificial metal alloy layer includes CuW, with about 80 atomic percent Cu and about 20 atomic percent W.

It should be noted that, although the above-described embodiments utilize CuW as an example of a sacrificial metal alloy layer material, other alloying elements such as Ta, Hf, Re, Ir, Os, etc., may be used along with Cu instead of W to provide similar effects as CuW.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   depositing a sacrificial metal alloy layer over a substrate, wherein the sacrificial metal alloy layer is wet etchable and comprises a first material having a first mill resistance and a second material having a second mill resistance that is higher than the first mill resistance, and wherein a mill resistance of the sacrificial metal alloy layer is greater than a mill resistance of Copper (Cu) and less than a mill resistance of Tungsten (W); and
   depositing a write pole layer over the sacrificial metal alloy layer, wherein the write pole layer comprises a bottom surface and a top surface opposite the bottom surface, and wherein a portion of the bottom surface of the write pole layer is in contact with the sacrificial metal alloy layer.

2. The method of claim 1 and wherein the substrate comprises a bumper bevel, and wherein the depositing the sacrificial metal alloy layer over the substrate comprises depositing a portion of the sacrificial metal alloy layer over the bumper bevel.

3. The method of claim 2 and further comprising, prior to depositing the write pole layer over the sacrificial metal alloy layer, carrying out a material removal process to remove portions of the sacrificial metal alloy layer that do not cover the bumper bevel, thereby exposing portions of the substrate, and wherein depositing the write pole layer comprises forming the write pole layer on the exposed portions of the substrate and on the sacrificial metal alloy layer portion that covers the bumper bevel.

4. The method of claim 3 and further comprising depositing a masking material over a portion of the top surface of the write pole layer.

5. The method of claim 4 and further comprising removing, by an oblique milling process, material from the write pole layer, the sacrificial metal alloy layer portion that covers the bumper bevel and the substrate unprotected by the masking material to form a write pole having first and second side walls between the portion of the top surface protected by the masking material and a remainder of the sacrificial metal alloy layer portion, and wherein a remainder of the substrate comprises a bumper portion.

6. The method of claim 5 and wherein a wall angle of the first side wall or the second side wall is between about 13 degrees and about 18 degrees.

7. The method of claim 5 and further comprising removing the bumper portion.

8. The method of claim 7 and further comprising carrying out a wet etch process to remove the remainder of the sacrificial metal alloy layer portion, wherein a high pH etchant that does not harm the material of the write pole layer is employed for the wet etch process.

9. The method of claim 1 and wherein the sacrificial metal alloy layer comprises Cu and an alloying element comprising one of W, Ta, Hf, Re, Ir or Os.

10. The method of claim 9 and wherein the sacrificial metal alloy layer comprises about 80 atomic percent Cu and about 20 atomic percent of the alloying element.

11. The method of claim 1 and wherein the pole layer comprises at least one of Fe, Co or Ni.

12. A method comprising:
   providing a substrate having an inclined bumper bevel and a horizontal portion;
   forming a sacrificial CuW alloy layer on the inclined bumper bevel of the substrate; and
   depositing a write pole layer on the sacrificial CuW alloy layer and on the horizontal portion of the substrate such that a bottom surface of the write pole layer is in contact with the sacrificial CuW alloy layer and the horizontal portion of the substrate.

13. The method of claim 12 and further comprising depositing a masking material over a portion of a top surface of the write pole layer.

14. The method of claim 13 and further comprising removing, by an oblique milling process, material from the write pole layer, the sacrificial CuW alloy layer portion that covers the bumper bevel and the substrate unprotected by the masking material to form a write pole having first and second side walls between the portion of the top surface protected by the masking material and a remainder of the sacrificial CuW alloy layer portion.

15. The method of claim 14 and further comprising carrying out a wet etch process to remove the remainder of the sacrificial CuW alloy layer portion.

* * * * *